US012574355B2

(12) United States Patent
Chin et al.

(10) Patent No.: US 12,574,355 B2
(45) Date of Patent: Mar. 10, 2026

(54) ZERO TRUST NETWORK ACCESS AND VIRTUAL PRIVATE NETWORK CLIENT OFFLOADING

(71) Applicant: AT&T Intellectual Property I, L.P., Atlanta, GA (US)

(72) Inventors: Jae-Sun Chin, Garland, TX (US); Barry Elia, King George, VA (US); Sridhar Narahari, Milpitas, CA (US); Michael Satterlee, Clifton Park, NY (US); John Gibbons, Ballston Lake, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 233 days.

(21) Appl. No.: 18/079,933

(22) Filed: Dec. 13, 2022

(65) Prior Publication Data
US 2024/0195783 A1     Jun. 13, 2024

(51) Int. Cl.
*H04L 9/40* (2022.01)
(52) U.S. Cl.
CPC ...... *H04L 63/0272* (2013.01); *H04L 63/0236* (2013.01); *H04L 63/0823* (2013.01)

(58) Field of Classification Search
None
See application file for complete search history.

(56) References Cited

U.S. PATENT DOCUMENTS

| | | | | |
|---|---|---|---|---|
| 2004/0243723 | A1* | 12/2004 | Davis .................... | H04L 69/161 709/250 |
| 2012/0230191 | A1* | 9/2012 | Fang ..................... | H04W 36/22 370/235 |
| 2013/0067231 | A1* | 3/2013 | Mudigonda ......... | H04L 67/1001 709/219 |
| 2022/0360506 | A1* | 11/2022 | Labonte .............. | H04L 47/2483 |

* cited by examiner

*Primary Examiner* — William J. Goodchild
(74) *Attorney, Agent, or Firm* — Hartman & Citrin LLC

(57) ABSTRACT

Concepts and technologies disclosed herein are directed to zero trust network access ("ZTNA") and virtual private network ("VPN") client offloading. According to one aspect, a user device can establish a private network session to access a private network resource in a private network. The user device can receive a request to offload the private network session from the user device to a secure router. In response to the request, the user device can offload the private network session to the secure router.

17 Claims, 8 Drawing Sheets

200

START

202 USER DEVICE ESTABLISHES, VIA PRIVATE NETWORK APPLICATION, PRIVATE NETWORK SESSION TO ACCESS PRIVATE NETWORK RESOURCES IN PRIVATE NETWORK

204 USER DEVICE RECEIVES BEACON SIGNAL TRANSMITTED BY SECURE ROUTER, WHEREIN BEACON SIGNAL INCLUDES ROUTER DIGITAL CERTIFICATE

206 USER DEVICE PROVIDES DEVICE DIGITAL CERTIFICATE TO SECURE ROUTER; USER DEVICE AND SECURE ROUTER ESTABLISH TRUST BASED UPON ROUTER DIGITAL CERTIFICATE AND DEVICE DIGITAL CERTIFICATE

208 USER DEVICE RECEIVES, VIA ROUTER MANAGEMENT APPLICATION, REQUEST TO OFFLOAD PRIVATE NETWORK SESSION FROM USER DEVICE TO SECURE ROUTER

210 USER DEVICE COORDINATES WITH POLICY MANAGEMENT SYSTEM TO DETERMINE WHETHER USER DEVICE IS PERMITTED, BASED UPON POLICY, TO OFFLOAD PRIVATE NETWORK SESSION TO SECURE ROUTER

212 IN RESPONSE TO REQUEST AND POLICY MANAGEMENT SYSTEM DETERMINING THAT USER DEVICE IS PERMITTED TO OFFLOAD PRIVATE NETWORK SESSION TO SECURE ROUTER, USER DEVICE OFFLOADS PRIVATE NETWORK SESSION TO SECURE ROUTER

214 END

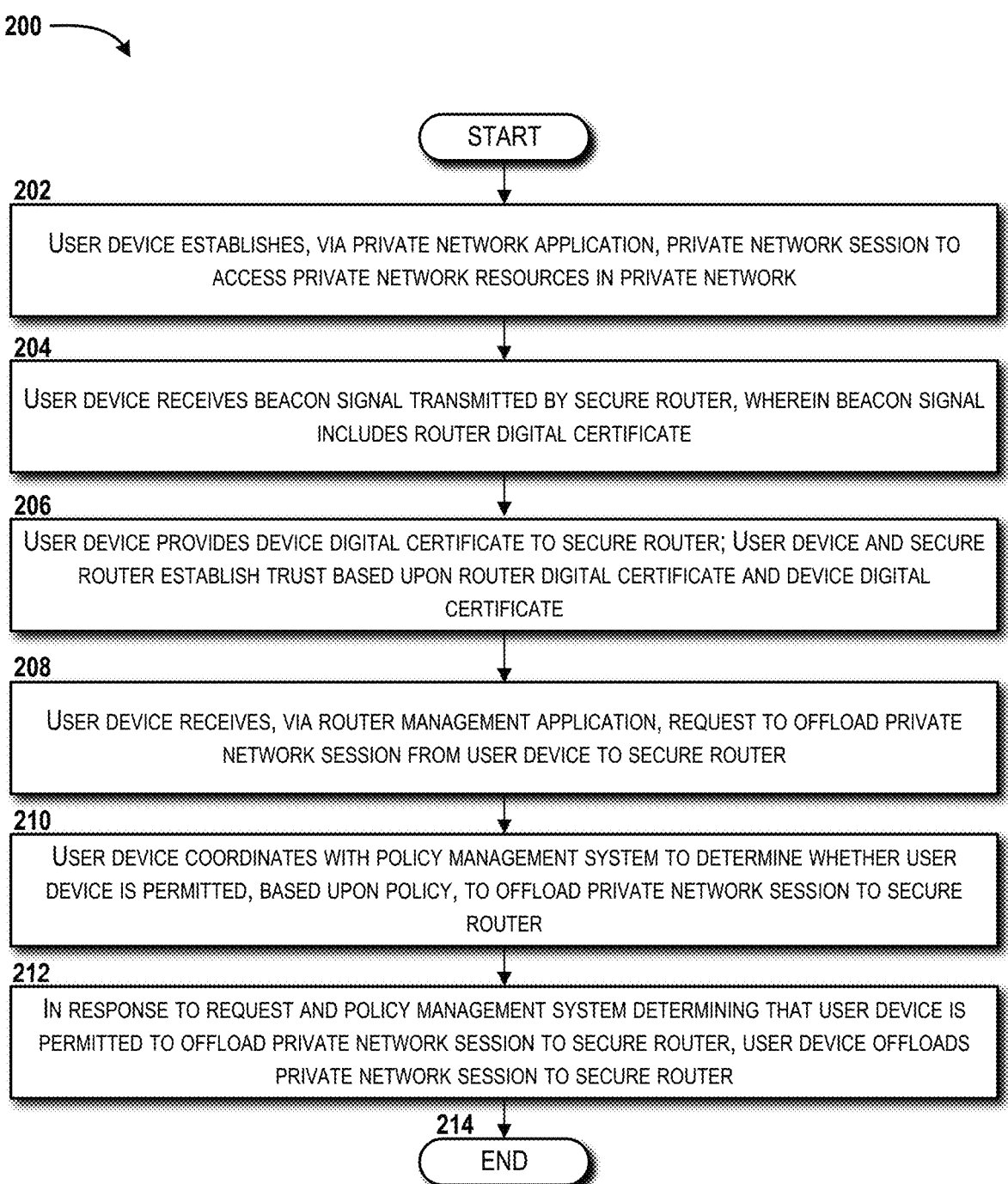

200

START

202
USER DEVICE ESTABLISHES, VIA PRIVATE NETWORK APPLICATION, PRIVATE NETWORK SESSION TO ACCESS PRIVATE NETWORK RESOURCES IN PRIVATE NETWORK

204
USER DEVICE RECEIVES BEACON SIGNAL TRANSMITTED BY SECURE ROUTER, WHEREIN BEACON SIGNAL INCLUDES ROUTER DIGITAL CERTIFICATE

206
USER DEVICE PROVIDES DEVICE DIGITAL CERTIFICATE TO SECURE ROUTER; USER DEVICE AND SECURE ROUTER ESTABLISH TRUST BASED UPON ROUTER DIGITAL CERTIFICATE AND DEVICE DIGITAL CERTIFICATE

208
USER DEVICE RECEIVES, VIA ROUTER MANAGEMENT APPLICATION, REQUEST TO OFFLOAD PRIVATE NETWORK SESSION FROM USER DEVICE TO SECURE ROUTER

210
USER DEVICE COORDINATES WITH POLICY MANAGEMENT SYSTEM TO DETERMINE WHETHER USER DEVICE IS PERMITTED, BASED UPON POLICY, TO OFFLOAD PRIVATE NETWORK SESSION TO SECURE ROUTER

212
IN RESPONSE TO REQUEST AND POLICY MANAGEMENT SYSTEM DETERMINING THAT USER DEVICE IS PERMITTED TO OFFLOAD PRIVATE NETWORK SESSION TO SECURE ROUTER, USER DEVICE OFFLOADS PRIVATE NETWORK SESSION TO SECURE ROUTER

214
END

Figure 3:
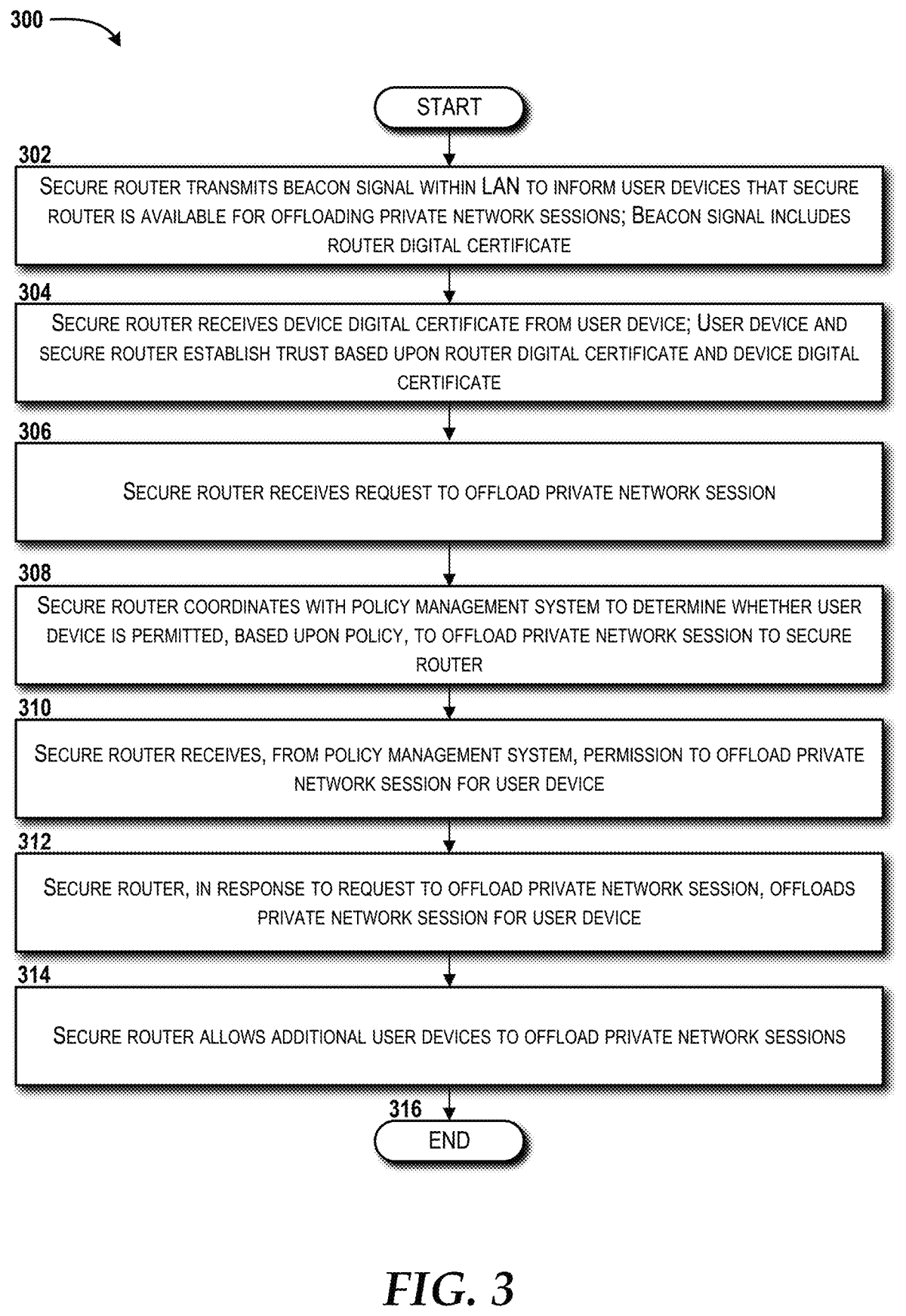

START

302

SECURE ROUTER TRANSMITS BEACON SIGNAL WITHIN LAN TO INFORM USER DEVICES THAT SECURE ROUTER IS AVAILABLE FOR OFFLOADING PRIVATE NETWORK SESSIONS; BEACON SIGNAL INCLUDES ROUTER DIGITAL CERTIFICATE

304

SECURE ROUTER RECEIVES DEVICE DIGITAL CERTIFICATE FROM USER DEVICE; USER DEVICE AND SECURE ROUTER ESTABLISH TRUST BASED UPON ROUTER DIGITAL CERTIFICATE AND DEVICE DIGITAL CERTIFICATE

306

SECURE ROUTER RECEIVES REQUEST TO OFFLOAD PRIVATE NETWORK SESSION

308

SECURE ROUTER COORDINATES WITH POLICY MANAGEMENT SYSTEM TO DETERMINE WHETHER USER DEVICE IS PERMITTED, BASED UPON POLICY, TO OFFLOAD PRIVATE NETWORK SESSION TO SECURE ROUTER

310

SECURE ROUTER RECEIVES, FROM POLICY MANAGEMENT SYSTEM, PERMISSION TO OFFLOAD PRIVATE NETWORK SESSION FOR USER DEVICE

312

SECURE ROUTER, IN RESPONSE TO REQUEST TO OFFLOAD PRIVATE NETWORK SESSION, OFFLOADS PRIVATE NETWORK SESSION FOR USER DEVICE

314

SECURE ROUTER ALLOWS ADDITIONAL USER DEVICES TO OFFLOAD PRIVATE NETWORK SESSIONS

316

END

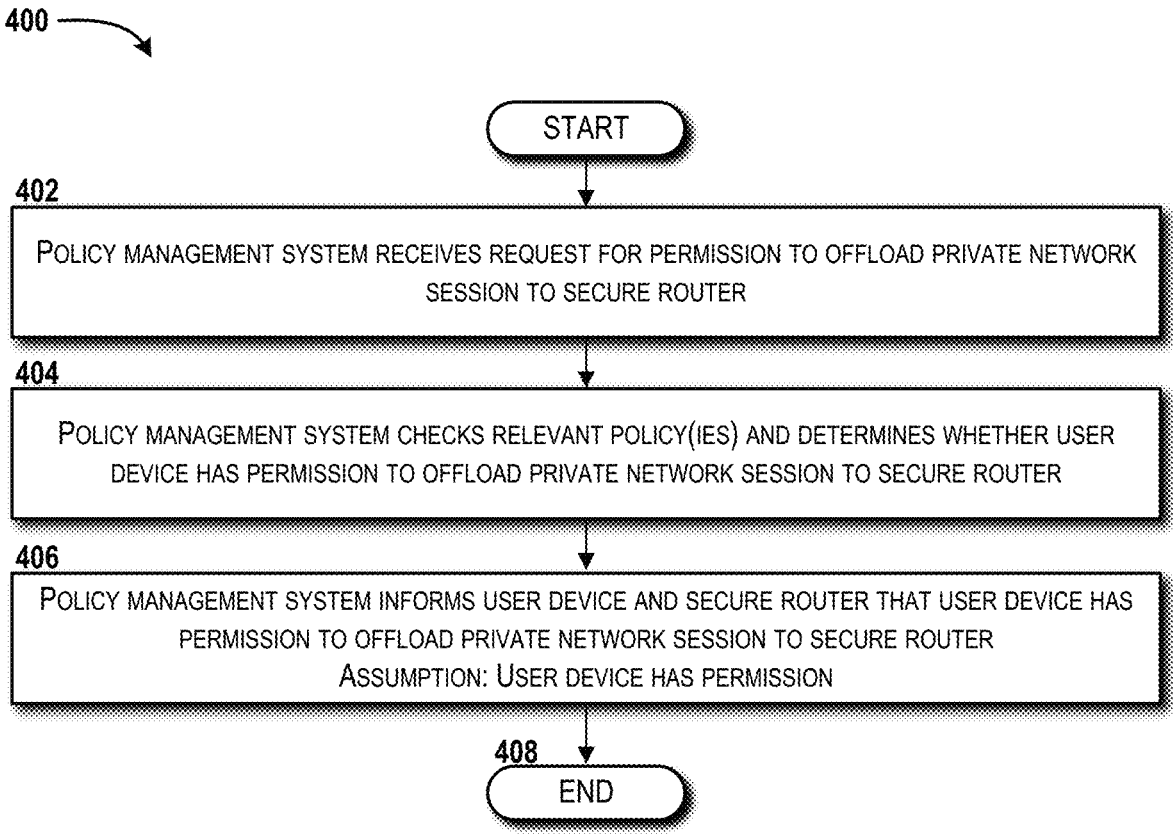

START

402

POLICY MANAGEMENT SYSTEM RECEIVES REQUEST FOR PERMISSION TO OFFLOAD PRIVATE NETWORK SESSION TO SECURE ROUTER

404

POLICY MANAGEMENT SYSTEM CHECKS RELEVANT POLICY(IES) AND DETERMINES WHETHER USER DEVICE HAS PERMISSION TO OFFLOAD PRIVATE NETWORK SESSION TO SECURE ROUTER

406

POLICY MANAGEMENT SYSTEM INFORMS USER DEVICE AND SECURE ROUTER THAT USER DEVICE HAS PERMISSION TO OFFLOAD PRIVATE NETWORK SESSION TO SECURE ROUTER
ASSUMPTION: USER DEVICE HAS PERMISSION

408

END

ZERO TRUST NETWORK ACCESS AND VIRTUAL PRIVATE NETWORK CLIENT OFFLOADING

BACKGROUND

Virtual private networks ("VPNs") provide secure network communications between end points by encrypting and encapsulating data transmissions. VPNs function on the assumption that all traffic within the VPN is trusted and all traffic outside of the VPN is untrusted. The concept of zero trust treats all traffic as untrusted and requires all incoming and outgoing traffic to be inspected regardless of the source and destination. Zero trust network access ("ZTNA") implements the concept of zero trust to deny access to networks and data assets by default and only permits access after extensive authentication.

Today, users often have multiple user devices, such as laptops, desktops, tablets, and smartphones, some of which may be used for work, others for personal use, and others that are dual-purpose. Each of these user devices requires its own authentication and ZTNA or VPN session. Each of these sessions requires additional compute resources at a user device to encrypt and decrypt traffic.

SUMMARY

Concepts and technologies disclosed herein are directed to ZTNA and VPN client offloading. According to one aspect of the concepts and technologies disclosed herein, a user device can include a processor and a memory. The memory can include instructions associated with a private network application and a router management application. The user device can establish, via the private network application, a private network session to access a private network resource in a private network. The user device can receive, via the router management application, a request to offload the private network session from the user device to a secure router. In response to the request, the user device can offload the private network session to the secure router.

In some embodiments, the user device can coordinate with a policy management system to determine whether the user device is permitted, based upon a policy, to offload the private network session to the secure router. In these embodiments, offloading the private network session to the secure router is based upon the policy management system determining that the user device is permitted, based upon the policy, to offload the private network session to the secure router. In some embodiments, the policy is a company policy, such as a policy defined by a company that employs a user associated with the user device. Other policies are contemplated.

In some embodiments, the user device can receive a beacon signal transmitted by the secure router. The beacon signal can include a router digital certificate associated with the secure router. The router digital certificate can establish, at least in part, trust between the user device and the secure router. The user device can provide a device digital certificate to the secure router. The device digital certificate can establish, at least in part, trust between the user device and the secure router. The secure router and the user device can be provisioned with the router digital certificate and the device digital certificate, respectively, by the policy management system.

In some embodiments, the secure router can allow one or more additional user devices to establish private network sessions with the same or different private network resources in the private network.

In some embodiments, the private network session is a ZTNA session. In other embodiments, the private network session is a VPN session.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a flow diagram illustrating a method for ZTNA and VPN client offloading from the perspective of a user device, according to an illustrative embodiment.

FIG. 3 is a flow diagram illustrating a method for ZTNA and VPN client offloading from the perspective of a secure router, according to an illustrative embodiment.

FIG. 4 is a flow diagram illustrating a method for ZTNA and VPN client offloading from the perspective of a policy management system, according to an illustrative embodiment.

DETAILED DESCRIPTION

Figure 1:
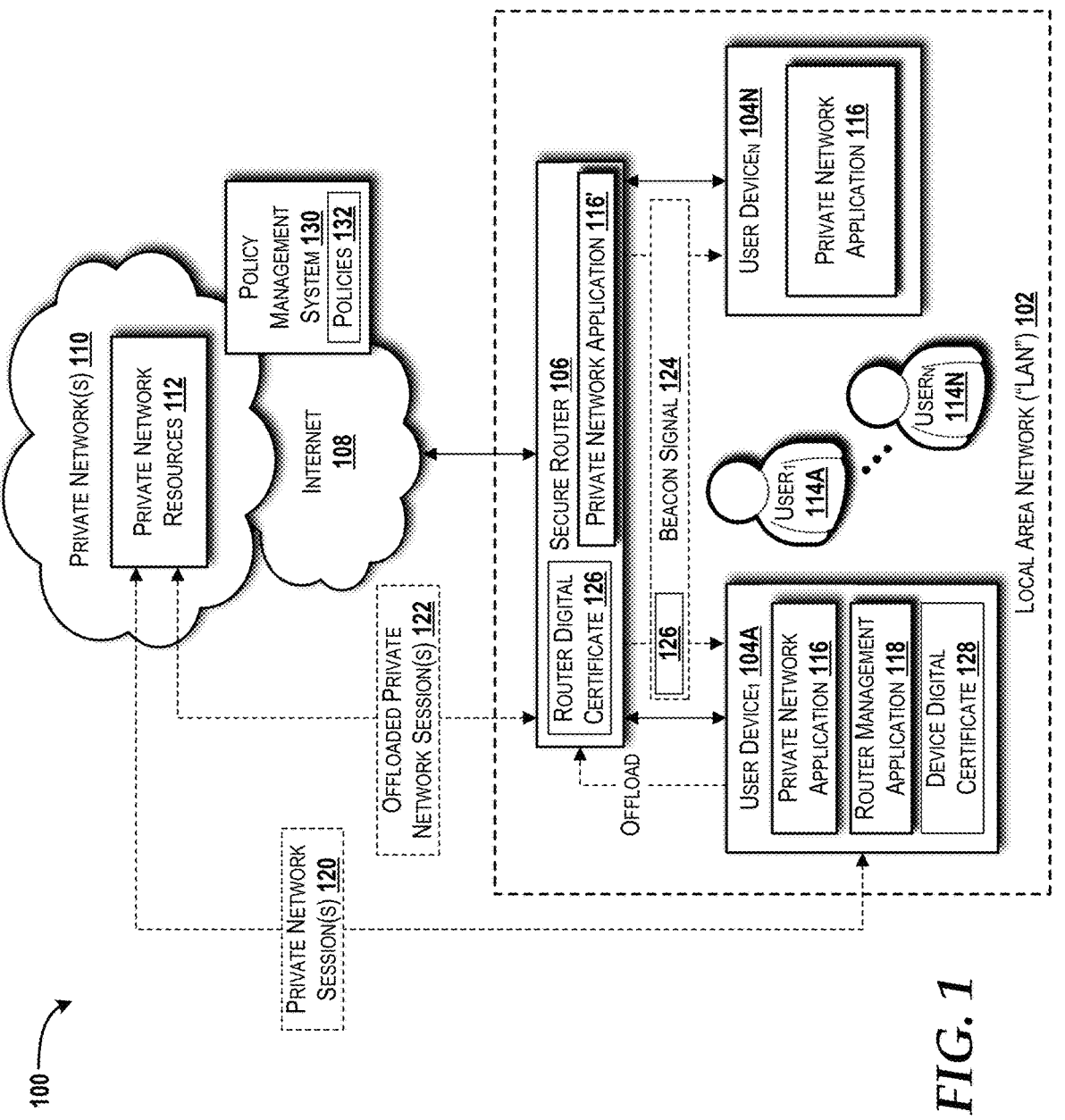
FIG. 1 is a block diagram illustrating an operating environment in which aspects of the concepts and technologies can be implemented.

Users, especially those that work for a company, frequently utilize private network access software, such as ZTNA or VPN software, running on their device to access private/restricted resources. Running this software directly on an end user's device is not convenient and can negatively impact user experience. The concepts and technologies disclosed herein provide greater ease-of-use and improved network and computing performance than existing solutions.

The concepts and technologies disclosed herein provide ZTNA and VPN client offloading. More particularly, secure LAN devices can search for and find a secure router. One secure LAN device can setup a ZTNA/VPN session and then allow that session to be offloaded onto the secure router.

Once the offload completes, all other secure LAN devices can use the secure router. In this manner, the computationally intensive task of encryption and decryption is offloaded onto the secure router. A secure connection can then be shared among other secure LAN-attached devices. There is no limit to the number of secure LAN-attached devices that can use the secure router.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for ZTNA and VPN client offloading will be described.

Turning now to FIG. 1, a block diagram illustrating aspects of an operating environment 100 in which the concepts and technologies disclosed herein can be implemented will be described. The illustrated operating environment 100 includes a local area network ("LAN") 102 in which a plurality of user devices 104A-104N (hereafter, at times, referred to individually as "user device 104" or collectively as "user devices 104") are operating. The user devices 104 can include computers, tablets, smartphones, video game consoles, set-top boxes, a combination thereof, and/or the like. The LAN 102 can provide wireless connectivity via any Institute of Electrical and Electronics Engineers ("IEEE") 802.11X technology (WI-FI). The LAN 102 alternatively or additionally can provide wired connectivity via IEEE 802.3 (Ethernet). The LAN 102 can be provided by one or more routers and/or access points, including, for example, a secure router 106. Moreover, the LAN 102 can include one or more modems (not shown) (e.g., cellular, cable, digital subscriber line "DSL", satellite, and/or fiber) that provide connectivity to one or more wide area networks ("WAN") such as the Internet 108. In the illustrated example, the Internet 108 provides connectivity to one or more private networks 110 (hereafter, at times, referred to individually as "private network 110" or collectively as "private networks 110"), such as a company's private network or a private cloud network. The private network 110 can host one or more private network resources 112, such as data and/or applications.

In the illustrated example, the user devices 104A-104N are associated with a plurality of users 114A-114N (hereafter, at times, referred to individually as "user 114" or collectively as "users 114"), respectively. The user device₁ 104A includes a private network application 116 and a router management application 118. The private network application 116 can be or can include a ZTNA application and/or a VPN application through which one or more private network sessions 120 can be created. The private network sessions 120 can be ZTNA sessions and/or VPN sessions through which the users 114 can access the private network resource(s) 112 via the private network(s) 110. The private network sessions 120 can be conducted through one or more secure tunnels (not shown). The router management application 118 allows the user 114 to interact with the secure router 106 to offload the private network session(s) 120 to the secure router 106. For example, the router management application 118 may provide an option (e.g., a selectable soft button or a hardware button on the user device 104) to offload the private network session(s) 120. The concept of offloading, as used herein, refers to transferring the control of the private network session(s) 120 to the secure router 106 (shown as offloaded private network session(s) 122). In some embodiments, the user device 104 can initiate offloaded private network session(s) 122 via the private network application 116. In these embodiments, the private network application 116 executed by the user device 104A can instruct the private network application 116' executed by the secure router 106 to initiate the offloaded private network session(s) 122. In some embodiments, when the user 114 manually enables offloading to the secure router 106 for the first time, the user 114 may be prompted whether or not the user 114 would like to remember the offload setting so that any offloads will be performed automatically in the future.

In any case, by offloading the private network session(s) 120 from the user device₁ 104A to the secure router 106, the computational overhead (e.g., to encrypt and decrypt data exchanged via the private network session(s) 120) is transferred from the user device₁ 104A to the secure router 106. Moreover, supporting network elements, such as a ZTNA/VPN concentrator (not shown), also benefit from lower computational overhead.

The secure router 106 can transmit a beacon signal 124 towards the user devices 104. The beacon signal 124 can include a router digital certificate 126 associated with the secure router 106. The illustrated user device₁ 104A can, in response, provide a device digital certificate 128 to the secure router 106. The other user devices 104 can provide other device digital certificates (not shown) as well. The router digital certificate 126 and the device digital certificate 128 can establish trust between the user device₁ 104A and the secure router 106. The secure router 106 and the user devices 104 can be provisioned with the router digital certificate 126 and the device digital certificates 128, respectively, by a policy management system 130. The policy management system 130, in some embodiments, can function as a digital certificate authority. Alternatively, a separate digital certificate authority may be utilized.

The illustrated policy management system 130 also includes one or more policies 132. The policies 132 can be defined, for example, by a company that employs or contracts the users 114. The policies 132 can be defined, for example, by a private network provider (e.g., a cloud network provider). The policies 132 can be defined by the users 114 and/or other entities (not shown). Other policies are contemplated.

In some embodiments, the user device 104 can coordinate with the policy management system 130 to determine whether the user device 104 is permitted, based upon one or more of the policies 132, to offload the private network session(s) 120 to the secure router 106. In these embodiments, offloading the private network session(s) 120 to the secure router 106 is based upon the policy management system 130 determining that the user device 104 is permitted, based upon the policy(ies) 132, to offload the private network session 120 to the secure router 106.

Turning now to FIG. 2, a flow diagram illustrating a method 200 for ZTNA and VPN client (e.g., the private network application 116) offloading from the perspective of the user device 104 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the methods are described as being performed, at least in part, by one or more processors (best shown in FIGS. 5 and 6), via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the user device 104 establishes, via the private network application 116, a private network session 120 to access one or more of the private network resources 112 in the private network 110. From operation 202, the method 200 proceeds to operation 204. At operation 204, the user device 104 receives the beacon signal 124 transmitted by the secure router 106. The beacon signal 124 includes the router digital certificate 126. From operation 204, the method 200 proceeds to operation 206. At operation 206, the user device 104 provides the device digital certificate 128 to the secure router 106. The user device 104 and the secure router 106 can establish trust based upon the exchange of the router digital certificate 126 and the device digital certificate 128.

From operation 206, the method 200 proceeds to operation 208. At operation 208, the user device 104 receives, via the router management application 118, a request to offload the private network session 120 from the user device 104 to the secure router 106. In some embodiments, the router management application 118 provides a soft button that can be selected by the user 114 to initiate the offload. In other embodiments, a hardware button on the user device 104 can be configured to initiate the offload via the router management application 118. The hardware button can be a dedicated offload button or a programmable hardware button.

From operation 208, the method 200 proceeds to operation 210. At operation 210, the user device 104 coordinates with the policy management system 130 to determine whether the user device 104 is permitted, based upon one or more of the policies 132, to offload the private network session 120 to the secure router 106.

From operation 210, the method 200 proceeds to operation 212. At operation 212, in response to the request and the policy management system 130 determining that the user device 104 is permitted to offload the private network session 120 to the secure router 106, the user device 104 offloads the private network session 120 to the secure router 106.

From operation 212, the method 200 proceeds to operation 214. The method 200 can end at operation 214.

Turning now to FIG. 3, a flow diagram illustrating a method 300 for ZTNA and VPN client (e.g., the private network application 116) offloading from the perspective of the secure router 106 will be described, according to an illustrative embodiment. The method 300 begins and proceeds to operation 302. At operation 302, the secure router 106 transmits the beacon signal 124 within the LAN 102 to inform the user devices 104 that the secure router 106 is available for offloading any private network sessions 120. The beacon signal 124 can include the router digital certificate 126.

From operation 302, the method 300 proceeds to operation 304. At operation 304, the secure router 106 receives the device digital certificate 128 from the user device 104. The user device 104 and the secure router 106 establish trust based upon the router digital certificate 126 and the device digital certificate 128.

From operation 304, the method 300 proceeds to operation 306. At operation 306, the secure router 106 receives a request, from the user device 104, to offload the private network session 120. From operation 306, the method 300 proceeds to operation 308. At operation 308, the secure router 106 coordinates with the policy management system 130 to determine whether the user device 104 is permitted, based upon one or more of the policies 132, to offload the private network session 120 to the secure router 106. From operation 308, the method 300 proceeds to operation 310. At operation 310, the secure router 106 receives, from the policy management system 130, permission to offload the private network session 120 for the user device 104.

From operation 310, the method 300 proceeds to operation 312. At operation 312, the secure router 106, in response to the request to offload the private network session 120 and receipt of permission to offload the private network session 120, offloads the private network session 120 for the user device 104. From operation 312, the method 300 proceeds to operation 314. At operation 314, the secure router 106 allows one or more additional user devices 104 to offload corresponding private network sessions 120 to the secure router 106.

From operation 314, the method 300 proceeds to operation 316. The method 300 can end at operation 316.

Turning now to FIG. 4, a flow diagram illustrating a method 400 for ZTNA and VPN client (e.g., the private network application 116) offloading from the perspective of the policy management system 130 will be described, according to an illustrative embodiment. The method 400 begins and proceeds to operation 402. At operation 402, the policy management system 130 receives a request for permission to offload the private network session 120 to the secure router 106. From operation 402, the method 400 proceeds to operation 404. At operation 404, the policy management system 130 checks relevant policy(ies) 132 and determines whether the user device 104 has permission to offload the private network session 120 to the secure router 106. From operation 404, the method 400 proceeds to operation 406. At operation 406, the policy management system 130 informs the user device 104 and the secure router 106 that the user device 104 has permission to offload the private network session 120 to the secure router 106. Although operation 406 is described under the assumption that the user device 104 has permission to offload the private network session 120 to the secure router 106, the policy management system 130 may inform the secure router 106 and/or the user device 104 that the user device 104 does not have permission to offload the private network session 120 to the secure router 106.

From operation 406, the method 400 proceeds to operation 408. The method 400 can end at operation 408.

Figure 5:
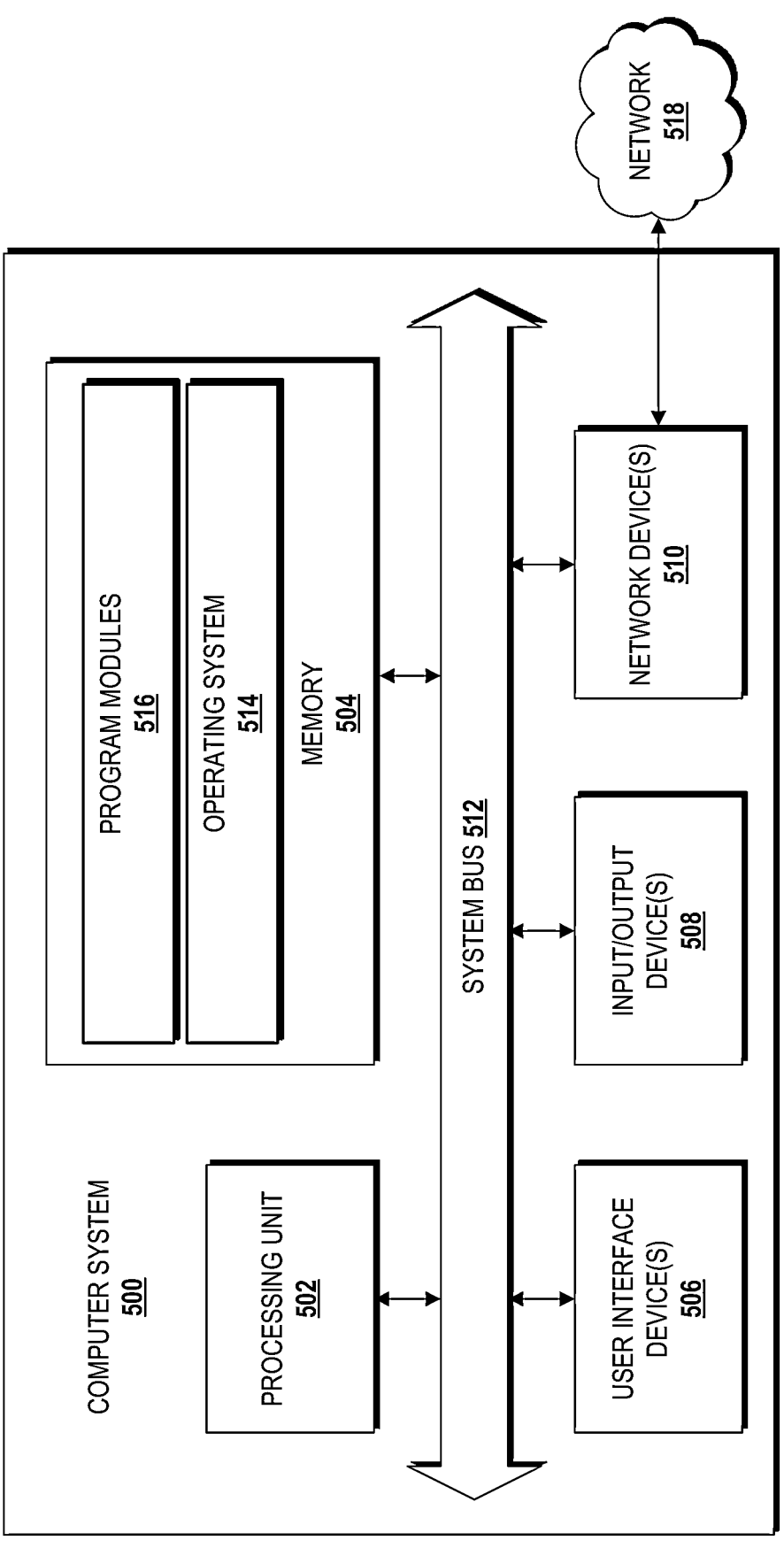
FIG. 5 is a block diagram illustrating an example computer system and components thereof capable of implementing aspects of the embodiments presented herein.

Turning now to FIG. 5, a block diagram illustrating a computer system 500 configured to provide the functionality in accordance with various embodiments of the concepts and technologies disclosed herein. The systems, devices, and other components disclosed herein can utilize, at least in part, an architecture that is the same as or at least similar to the architecture of the computer system 500. For example, the user device(s) 104, the secure router 106, the private network resources 112, the policy management system 130, or some combination thereof can utilize, at least in part, an architecture that is the same as or at least similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the MAC OSX and/or iOS families of operating systems from APPLE CORPORATION, other operating systems, and the like.

The program modules 516 may include various software and/or program modules to perform the various operations described herein. The program modules 516 for the computer system 500 embodied as the user device 104 can include the private network application 116 and the router management application 118. The program modules 516 for the computer system 500 embodied as the secure router 106 can include the private network application 116'. The program modules 516 and/or other programs can be embodied in computer-readable media containing instructions that, when executed by the processing unit 502, perform one or more operations, such as the operations described herein above with reference to the methods 200, 300, 400 illustrated in FIGS. 2, 3, and 4, respectively. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

Figure 7:
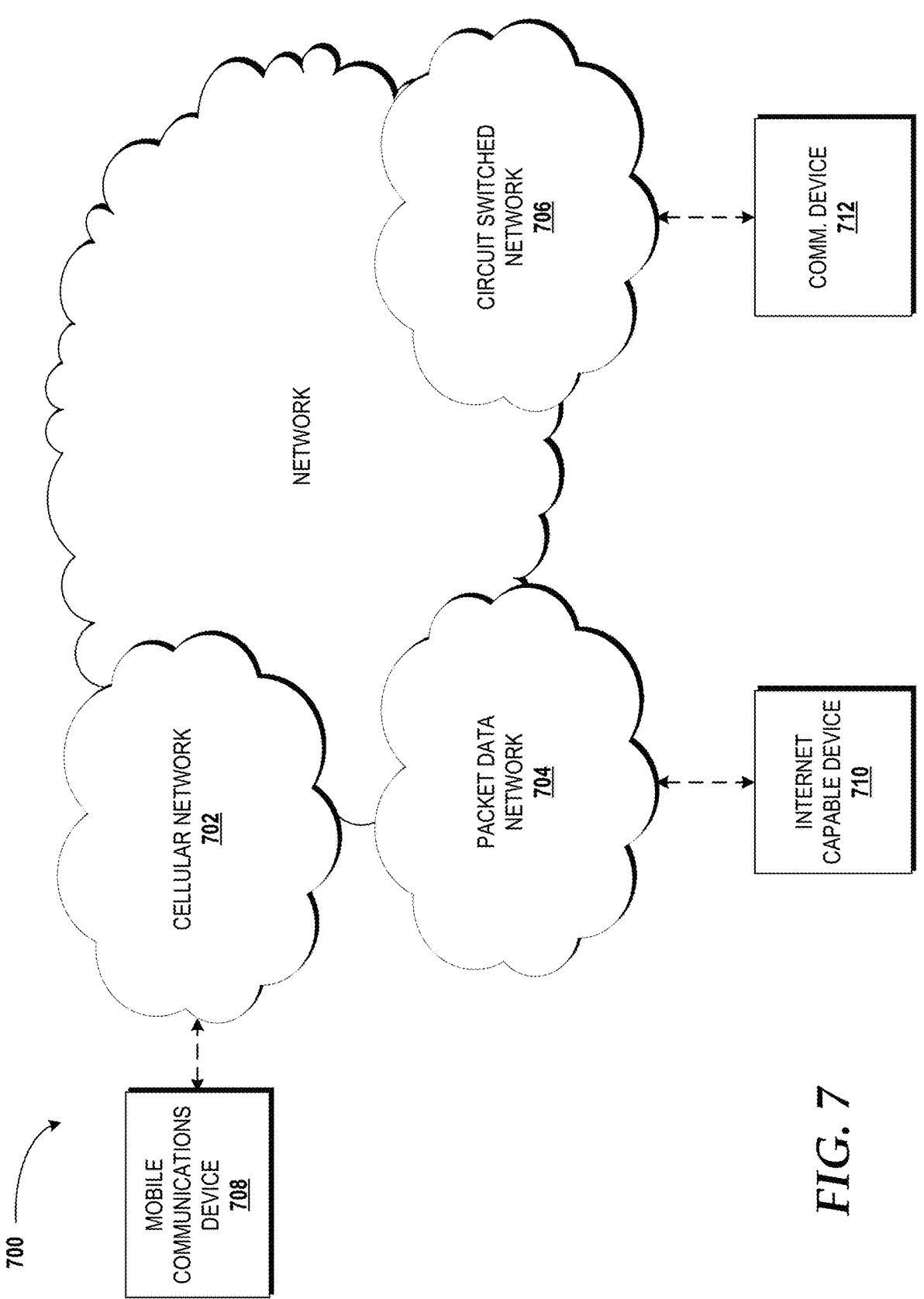
FIG. 7 is a block diagram illustrating an example network capable of implementing aspects of the embodiments presented herein.

The network devices 510 enable the computer system 500 to communicate with other networks or remote systems via a network 518, such as the LAN 102, the Internet 108, the private network(s) 110, and/or a network 700 (best shown in FIGS. 1 and 7). Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 518 may be a wired network such as, but not limited to, a wide area network ("WAN"), a wired LAN such as provided via Ethernet, a wired personal area network n ("PAN"), or a wired metropolitan area network ("MAN").

Figure 6:
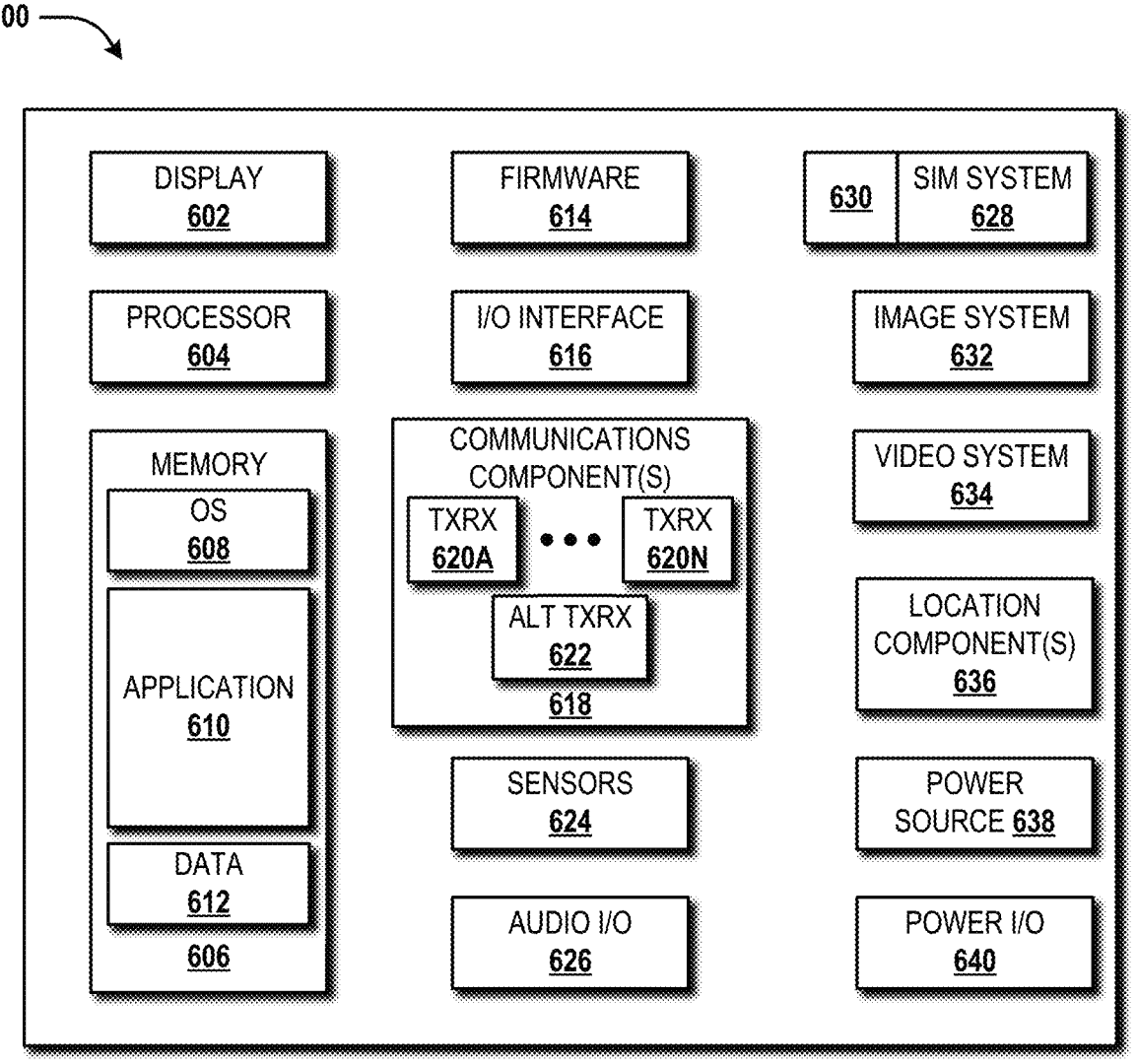
FIG. 6 is a block diagram illustrating an example mobile device and components thereof capable of implementing aspects of the embodiments presented herein.

Turning now to FIG. 6, an illustrative mobile device 600 and components thereof will be described. In some embodiments, the user devices 104 described above with reference to FIG. 1 can be configured as and/or can have an architecture similar or identical to the mobile device 600 described herein in FIG. 6. It should be understood, however, that the user devices 104 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610 (e.g., the private network application 116 and the router management application 118), other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600.

According to various embodiments, the applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks described above herein. In some embodiments, other networks include networks that utilize noncellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA, CDMAONE, CDMA2000, LTE, and various other 2G, 2.5G, 3G, 4G, 5G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from GPS devices, A-GPS devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 500 described above with reference to FIG. 5. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 600 in order to store and execute the software components presented herein. It is also contemplated that the mobile device 600 may not include all of the components shown in FIG. 6, may include other components that are not explicitly shown in FIG. 6, or may utilize an architecture completely different than that shown in FIG. 6.

Turning now to FIG. 7, additional details of a network 700, such as the network(s) 106, are illustrated, according to an illustrative embodiment. The network 700 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the user device 104, a cellular telephone, a user equipment, a mobile terminal, a PDA, a laptop computer, a handheld computer, and combinations thereof, can be operatively connected to the cellular network 702. The cellular network 702 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 702 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 702 also is compatible with 4G mobile communications standards such as Long-Term Evolution ("LTE"), or the like, as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, the user device 104, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 700 is used to refer broadly to any combination of the networks 702, 704, 706. It should be appreciated that substantially all of the functionality described with reference to the network 700 can be performed by the cellular network 702, the packet data network 704, and/or the circuit switched network 706, alone or in combination with other networks, network elements, and the like.

Figure 8:
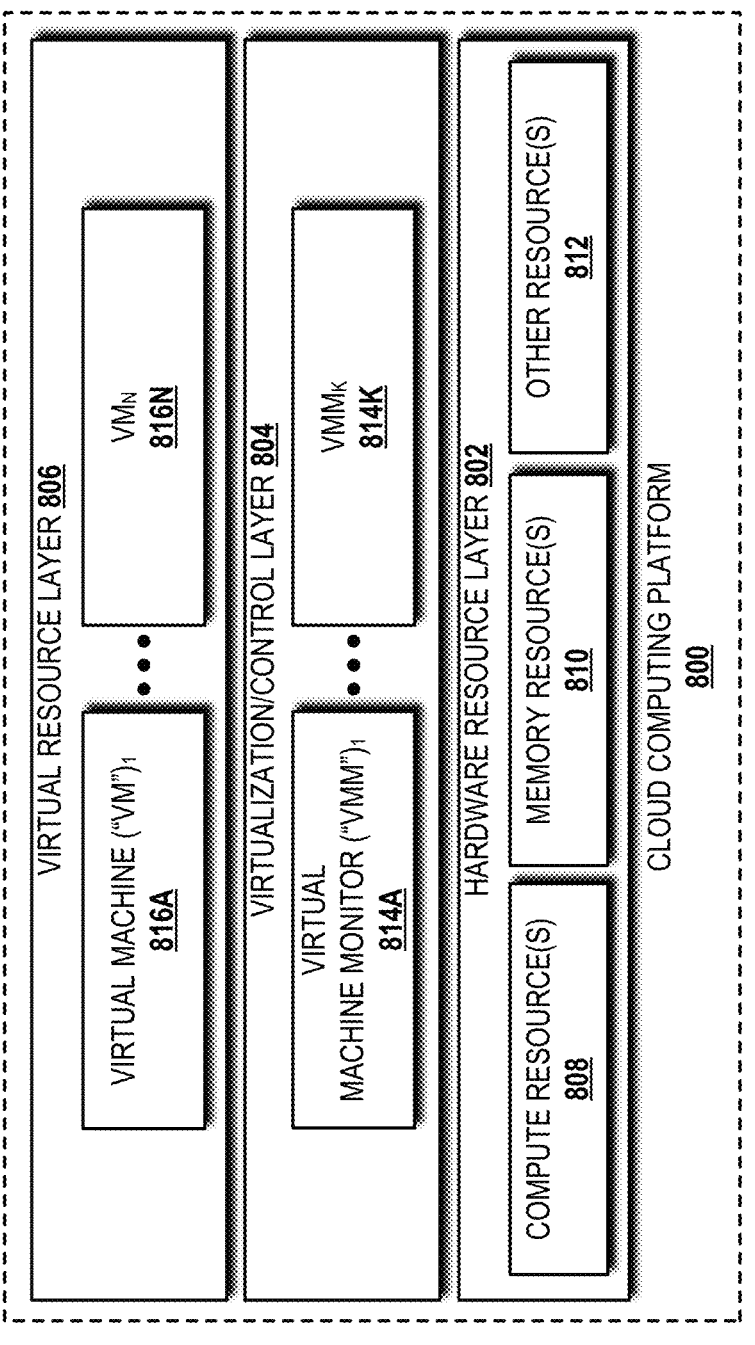
FIG. 8 is a block diagram illustrating an example cloud computing network and components thereof capable of implementing aspects of the embodiments presented herein.

Turning now to FIG. 8, a cloud computing platform 800 will be described, according to an exemplary embodiment. In some embodiments, the private network(s) 110 can be implemented based upon an architecture similar to or the same as the cloud computing platform 800.

The cloud computing platform 800 is a shared infrastructure that can support multiple services and network applications. The illustrated cloud computing platform 800 includes a hardware resource layer 802, a virtualization/control layer 804, and a virtual resource layer 806 that work together to perform operations as will be described in detail herein.

The hardware resource layer 802 provides hardware resources, which, in the illustrated embodiment, include one or more compute resources 808, one or more memory resources 810, and one or more other resources 812. The compute resource(s) 808 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812. In some embodiments, the compute resources 808 can be or can include one or more SNAPDRAGON SoCs, available from QUAL-COMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, California, and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 808 and/or the memory resource(s) 810 to perform operations described herein. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 802 can be virtualized by one or more virtual machine monitors ("VMMs") 814-814K (also known as "hypervisors;" hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816-816N (hereinafter "VMs 816"). Each of the VMs 816 can execute one or more applications.

Based on the foregoing, it should be appreciated that concepts and technologies directed to ZTNA and VPN client offloading have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:

establishing, by a user device comprising a processor executing a private network application, a private network session to access a private network resource in a private network;

receiving, by the user device, a beacon signal transmitted by a secure router, wherein the beacon signal comprises a router digital certificate associated with the secure router, and wherein the router digital certificate establishes, at least in part, trust between the user device and the secure router;

receiving, by the user device comprising the processor executing a router management application, a request to offload the private network session from the user device to the secure router;

coordinating, by the user device, with a policy management system to determine whether the user device is permitted, based upon a policy, to offload the private network session to the secure router; and in response to the request and based upon the policy management system determining that the user device is permitted, based upon the policy, to offload the private network session to the secure router, offloading, by the user device, the private network session to the secure router.

2. The method of claim 1, wherein the policy comprises a company policy.

3. The method of claim 1, further comprising providing, by the user device, a device digital certificate to the secure router, wherein the device digital certificate establishes, at least in part, trust between the user device and the secure router.

4. The method of claim 3, wherein the secure router is provisioned with the router digital certificate by the policy management system, and wherein the user device is provisioned with the device digital certificate by the policy management system.

5. The method of claim 1, further comprising allowing, by the secure router, a further user device to establish a further private network session to access a further private network resource in the private network.

6. The method of claim 1, wherein the private network session comprises a zero trust network access session or a virtual private network session.

7. A user device comprising:

a processor; and a memory comprising computer-executable instructions that, when executed by the processor, cause the processor to perform operations comprising establishing, via a private network application, a private network session to access a private network resource in a private network, receiving a beacon signal transmitted by a secure router, wherein the beacon signal comprises a router digital certificate associated with the secure router, and wherein the router digital certificate establishes, at least in part, trust between the user device and the secure router, receiving, via a router management application, a request to offload the private network session from the user device to the secure router, coordinating with a policy management system to determine whether the user device is permitted, based upon a policy, to offload the private network session to the secure router, and in response to the request and based upon the policy management system determining that the user device is permitted, based upon the policy, to offload the private network session to the secure router, offloading the private network session to the secure router.

8. The user device of claim 7, wherein the policy comprises a company policy.

9. The user device of claim 7, wherein the operations further comprise providing a device digital certificate to the secure router, wherein the device digital certificate establishes, at least in part, trust between the user device and the secure router.

10. The user device of claim 9, wherein the secure router is provisioned with the router digital certificate by the policy management system, and wherein the user device is provisioned with the device digital certificate by the policy management system.

11. The user device of claim 7, wherein the private network session comprises a zero trust network access session or a virtual private network session.

12. The user device of claim 7, wherein the operations further comprise allowing a further user device to establish a further private network session to access a further private network resource in the private network.

13. A computer-readable storage medium having computer-executable instructions stored thereon that, when executed by a processor of a user device, causes the processor to perform operations comprising:

establishing, via a private network application, a private network session to access a private network resource in a private network;

receiving a beacon signal transmitted by a secure router, wherein the beacon signal comprises a router digital certificate associated with the secure router, and wherein the router digital certificate establishes, at least in part, trust between the user device and the secure router;

receiving, via a router management application, a request to offload the private network session from the user device to the secure router;

coordinating with a policy management system to determine whether the user device is permitted, based upon a policy, to offload the private network session to the secure router; and in response to the request and based upon the policy management system determining that the user device is permitted, based upon the policy, to offload the private network session to the secure router, offloading the private network session to the secure router.

14. The computer-readable storage medium of claim 13, wherein the operations further comprise providing, a device digital certificate to the secure router, wherein the device digital certificate establishes, at least in part, trust between the user device and the secure router.

15. The computer-readable storage medium of claim 13, wherein the private network session comprises a zero trust network access session or a virtual private network session.

16. The computer-readable storage medium of claim 13, wherein the policy comprises a company policy.

17. The computer-readable storage medium of claim 13, wherein the operations further comprise allowing a further user device to establish a further private network session to access a further private network resource in the private network.

* * * * *